No. 718,212. PATENTED JAN. 13, 1903.
E. S. LORIMER.
ELECTROMECHANICAL MOVEMENT.
APPLICATION FILED MAR. 8, 1902.
NO MODEL. 3 SHEETS—SHEET 1.
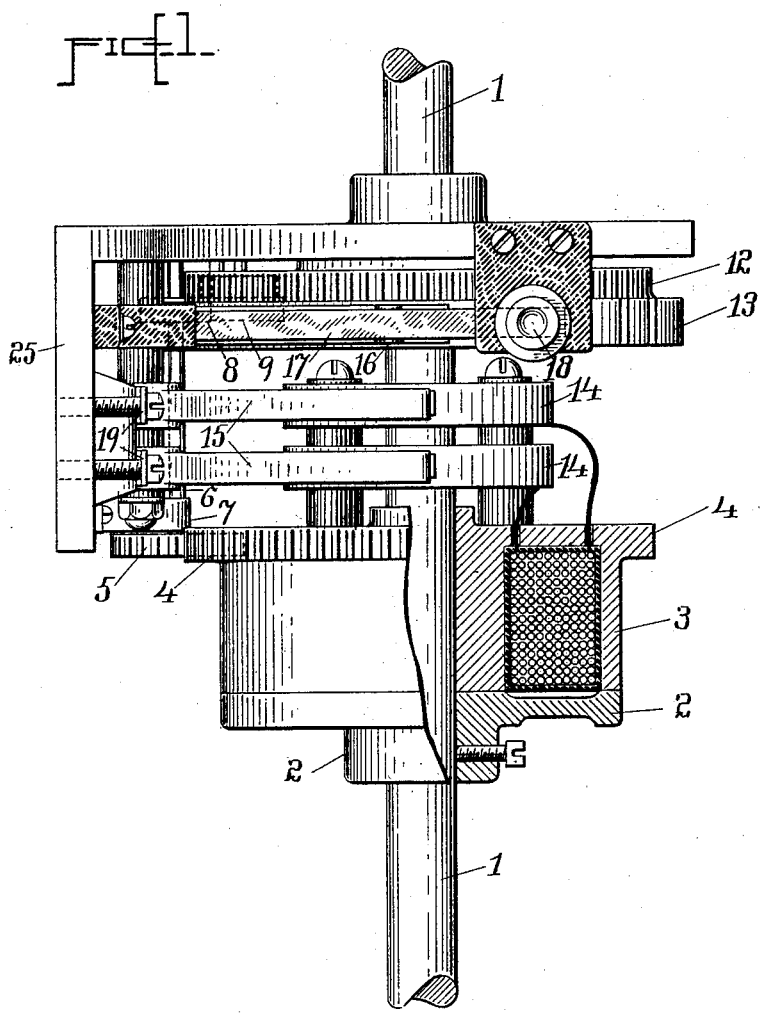
Witnesses:
Otto Greenberg
E. L. Lawler
Inventor
Egbert S. Lorimer
By H. Townsend
Attorney

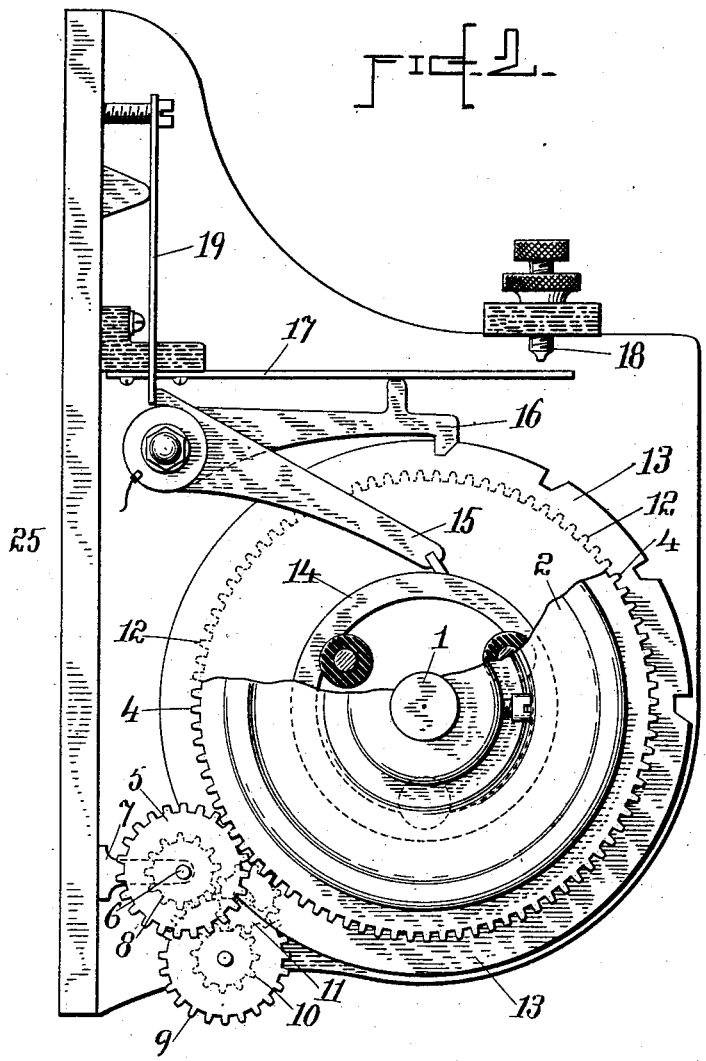

No. 718,212. PATENTED JAN. 13, 1903.
E. S. LORIMER.
ELECTROMECHANICAL MOVEMENT.
APPLICATION FILED MAR. 8, 1902.
NO MODEL. 3 SHEETS—SHEET 3.
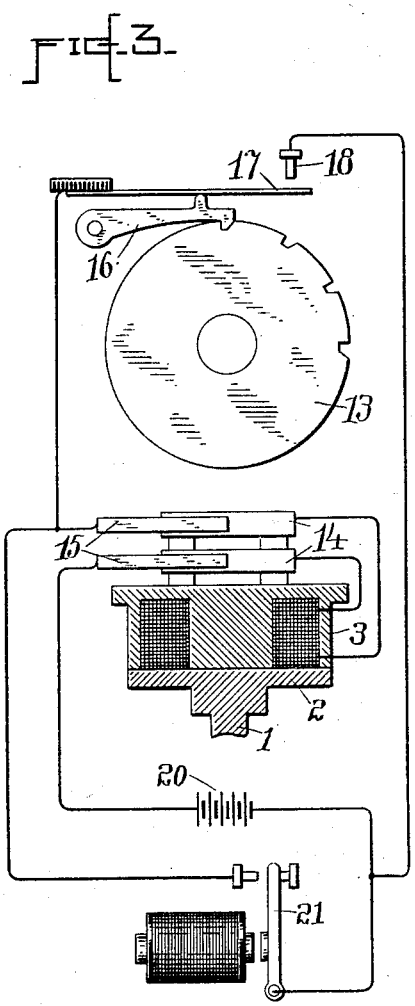

UNITED STATES PATENT OFFICE.

EGBERT S. LORIMER, OF PIQUA, OHIO.

ELECTROMECHANICAL MOVEMENT.

SPECIFICATION forming part of Letters Patent No. 718,212, dated January 13, 1903.

Application filed March 8, 1902. Serial No. 97,386. (No model.)

*To all whom it may concern:*

Be it known that I, EGBERT S. LORIMER, a citizen of the United States, and a resident of Piqua, in the county of Miami and State of Ohio, have invented certain new and useful Improvements in Electromechanical Movements, of which the following is a specification.

My invention consists of a novel electromechanical movement, and is designed as an improvement upon devices heretofore employed which, generally speaking, comprise a driving power or shaft, a driven mechanism, a magnetically controlled or operated clutch for coupling the driving and driven mechanisms, and means for automatically uncoupling said mechanisms brought into action by the driven mechanism when it has completed a predetermined or desired movement.

It has before my invention been proposed to couple the driving and driven mechanisms by means of an electromagnet which initially brings the members of the clutch or coupling device into engagement and to keep them in engagement until the driven mechanism has completed the desired movement by means of an arm or dog mechanically connected to the clutch mechanism and riding on an uncut or uninterrupted surface moving with the driven mechanism, and consisting, preferably, of a rotating disk or plate, until it is found by a notch or offset in said surface suitably placed or located and by dropping into said notch uncouples the driving power, so as to stop the driven mechanism at the required point in its movement.

My present invention consists, broadly, of a novel combination of devices wherein I substitute for the mechanical connection of the dog and clutch a circuit closer and breaker or suitable circuit-controller governing the circuit of an electromagnet which holds the members of the clutch or coupling in engagement until the driven mechanism moves to the desired point and there operates upon the circuit-controller to permit the magnet to free the driven from the driving devices. Preferably the magnet which thus keeps the mechanisms coupled is the magnet which acts to initially couple them; and my invention therefore consists, further, of a combination of devices, as hereinafter recited in the claims, wherein the electromagnet is initially charged in any suitable way to initially couple the mechanisms and is kept charged until the driven mechanism reaches the desired point where it shall come to rest and there changes the condition of the circuit, so as to discharge the magnet. Preferably, also, the clutch is one whose clutch-surfaces are of magnetizable material and form a part of the magnetic circuit of the electromagnet used in the combination.

My invention consists also of other features of construction and combinations of parts, as hereinafter described, and more particularly specified in the claims.

In carrying out my invention any desired form of circuit closer and breaker or other circuit-controlling means governed by or in accordance with the position assumed by the driven mechanism may be employed. I have, however, for the sake of illustration assumed the use of a circuit closer and breaker operated by an arm or dog which rides on the edge of a notched disk or plate moving with the driven mechanism and which by entering a notch causes the circuit to be opened, while it closes the circuit so long as it is forced to ride on the uncut edge or surface. Other ways of controlling or operating upon an electric circuit in the desired way at predetermined points in the movement of a revolving body will, however, readily occur to those skilled in the art of electricity as suitable for this part of the apparatus constituting my invention.

In the accompanying drawings, Figure 1 is a general side elevation and partial vertical section of a form of apparatus embodying my invention. Fig. 2 is an inverted plan view of the same. Fig. 3 is a diagram of circuits of the apparatus.

1 is any constantly-rotating driving-shaft. 3 is one member, and 2 the other member, of the clutch, one secured to the shaft and the other connected in any suitable way with the mechanism to be intermittently driven or operated. Either member may be secured to the shaft 1. In the form of my invention here shown the member 3 is a cup-shaped body of iron and is sleeved on shaft 1 to permit the one member to turn independently of the other. The sleeve is preferably also of iron and extends from the bottom of the cup to a level with the edge of said cup. The member 2 is a plate of iron secured to shaft 1 and forming a cover-plate for the cup and adapted to engage the same at its edge. It might also engage the sleeve at the center, although this is not necessary. The shaft 1 passes through the axis of the cup, as shown, and within the cup is a magnetizing-coil whose magnetic axis practically coincides with the axis of rotation of the parts. By the construction shown an ironclad magnet is formed of great strength and adapted to form a clutch whose magnetizable clutch-surfaces shall be in the magnetic circuit of the magnet, and therefore strongly active.

The clutch-surfaces are the surfaces of engagement of the cup and disk, and when current flows in the coils the surfaces become strongly magnetized and strongly adherent, so as to couple the driving-power to the driven mechanism and rotate the member against a considerable resistance to rotation.

The member 3 is supported at its edge upon the member 2, but only rotates therewith when the parts are magnetized. At other times or when no current flows in the coil the resistance of the part 3 and connected or driven mechanism to rotation is such that the friction between the engaged surfaces cannot overcome it.

As will be obvious, either member may be supported on the other and either might be the intermittently-rotating member. In any of such variations the clutch-surfaces would constitute the bearing-surfaces, upon which one of the members would be supported when the intermittently-rotating member is at rest. Connection with the magnetizing-coil may be made by insulated rings 14, supported on the cup by insulating-posts, as shown, and engaged by contact-brushes 15, held against the rings by springs 19, all of any suitable form and supported in any suitable manner—as, for instance, in the frame 25.

Member 3 is the driven or is connected with the driven device in any of the usual ways—as, for instance, by gear 4, meshing with a train of gears. Moving with said mechanism or device or constituting the final driven member of my invention is a circuit-controlling disk, wheel, or device 13, which operates suitably upon the circuit of the clutch-electromagnet. The particular intermediate gear shown, and any part of which may constitute or be connected with the device or mechanism which is to be started from and stopped at predetermined or certain positions, comprises in regular order, proceeding from wheel 4, the following: gear 5 on shaft 6, stepped in bearing 7 and carrying gear-wheel 8, meshing with wheel 9, which latter carries wheel 10, gearing with a wheel 11, that in turn gears with wheel 12, supporting or supported by disk 13. The control of the circuit by disk 13 may be effected in the following or any other desired way: At points in the edge of disk 13 are depressions or notches whose positions are chosen or selected so that coincidently with the arrival of the driven mechanism or device at any of its required positions of rest the spring-actuated dog or arm operated by spring 19 and engaging with said disk at its edge will find a notch and by dropping into the same will permit a contact-spring 17 to leave a contact-point 18. While the dog or arm rides on the unbroken surface of the disk's edge, it holds the spring 17 against the contact 18, and thereby keeps the circuit of the clutch-magnet closed, as clearly shown in the diagram; but when it rests in a notch the circuit is broken, the magnet is discharged, and the members of the clutch cease to be effectively coupled. The dog by entering the notch also affords a partial obstruction to the continued movement of the disk and may therefore aid in bringing the disk to rest when the circuit of the magnet is broken, and thereby overcome any tendency of the disk to continue to revolve by residual magnetism in the members of the clutch. This locking action of the clutch will obviously be of greater or less effect, depending upon the angle given to the inclined surfaces where the dog rests in the notch, since the less the inclination the greater the power required to rotate the disk and raise the dog out of the notch. The resistance to rotation will also obviously depend upon the strength of the spring 17.

As already stated, the circuit of the magnet might be controlled in other ways when the driven mechanism arrives at the desired point.

The clutch may be initially coupled in any desired way, preferably by the action of the magnet, which maintains the engagement while the driven mechanism is rotating from one position of rest to another. As indicated in the diagram, a circuit-closer 21, which may be the armature of an electromagnet and be momentarily actuated thereby or may be otherwise constructed and actuated, may serve to cause the clutch-magnet to be suitably energized by closing a circuit for a charging-generator 20. This may be the same generator whose circuit is controlled by the disk 13, the two circuit-closing devices being for that purpose arranged in multiple, as shown. The general operation is as follows, assuming that the parts are in the position shown in the diagram: Both circuit-controlling devices will be open and the clutch-magnet being uncharged the driving and driven mechanisms will be uncoupled, so that controller-disk 13 will be at rest and arm 16 will remain in the notch corresponding to one of the positions of rest to be maintained by the driven mechanism. Assuming that the driven mechanism is to be moved forward to the next position of rest, the circuit-closer 21 is operated momentarily, thus initially charging the coupling-magnet and putting the driven mechanism, with connected disk 13, into movement, so that arm 16 will be lifted out of the notch by the rotation of the disk, and the circuit of the clutch-magnet will be closed at 18 independently of the device which effects the initial closure. The circuit will continue to be closed until the arm 16 finds the next notch in the disk, because in the meantime the arm rides on the unmutilated surface at the edge of the disk. It will be understood that the initial coupling of the clutch members by the circuit-closer 21 or other means must be maintained until the driven mechanism has moved so far that the circuit will be closed at contact 18. Subject to this limitation the initial action may be a momentary action, and the movement of the driven mechanism in the intervals of time corresponding to the length of the spaces between the notches takes place under the control of the circuit closer and breaker or other device actuated or controlled by or in accordance with the movement of the driven mechanism. When the next notch is found, the circuit of the clutch-magnet is opened, as already explained, and the driven mechanism comes to a stop in its required position of rest, but ready to move forward another notch or stop of a length predetermined by the distance between notches whenever the clutch-magnet is initially excited by the momentary closure of circuit at 21 or by other means.

What I claim as my invention is—

1. An improved electromechanical movement comprising a driving device, a driven device, a clutch or coupling between them, a magnet for keeping the members of the clutch coupled, a circuit for said magnet and means controlled by the driven mechanism when it has been moved to the predetermined or desired extent for changing said circuit so as to uncouple the driving and driven devices.

2. The combination substantially as described, of a driving mechanism, a driven mechanism, a clutch, a magnet for initially coupling the members thereof, a circuit-controller governing the circuit of said magnet, and means connected with the driven mechanism for operating the circuit-controller as described, to charge the magnet as soon as the driven mechanism starts and to discharge the same as soon as said mechanism has moved to the predetermined or desired extent.

3. The combination substantially as described with a magnetic clutch and a driven mechanism therefor, of a notched wheel and dog arranged as described to resist the tendency of the driven mechanism to rotate by the residual magnetism, and means controlling the circuit of the magnet and adapted to act when in the rotation of the driven mechanism it reaches a point where the dog registers with the notch.

4. The combination substantially as described of a magnetically controlled or operated clutch whose clutch-surfaces are of magnetizable material, a circuit and circuit controller for initially charging the magnet and clutch-surfaces, and a circuit-controller connected with the driven mechanism for keeping the magnet charged until the driven mechanism has moved to the predetermined or desired point.

5. The combination substantially as described, of a clutch, an electromagnet for keeping the members of the clutch coupled, a driven mechanism, a momentarily-acting device for initially charging the magnet, and means connected with the driven mechanism for maintaining a charging-circuit for said magnet after the initial charging and for a period of time dependent upon the extent of movement to be given to the driven mechanism before it is to be again brought to rest.

Signed at Piqua, in the county of Miami and State of Ohio, this 12th day of December, A. D. 1901.

EGBERT S. LORIMER.

Witnesses:
CLARK B. JAMISON,
WILLIAM C. JOHNSTON.